INVENTOR.
BURTON BERNARD

United States Patent Office 3,358,974
Patented Dec. 19, 1967

3,358,974
TEMPERATURE CONTROL ARRANGEMENT
Burton Bernard, Santa Barbara, Calif., assignor to Electro Optical Industries, Inc., a corporation of California
Filed Feb. 21, 1966, Ser. No. 529,045
10 Claims. (Cl. 263—3)

ABSTRACT OF THE DISCLOSURE

There is described herein an arrangement for controlling the temperature of a transparent, semi-transparent or opaque material such as a plastic. This is achieved through emitting a predetermined quantity of electromagnetic radiation by transmittal through the material whose temperature is to be controlled. A radiation thermometer receives this electromagnetic radiation after transmittal through the material and also receives the radiation from the material itself. From these two sources an information signal is generated that determines the difference between the temperature of the material at a predetermined value which would provide an error signal and deviations from this predetermined value which provide an error signal. The temperature of, for example, an oven may be automatically controlled in response to the magnitude of the error signal to maintain a constant temperature on the material whose temperature is to be controlled.

---

Figure 1:
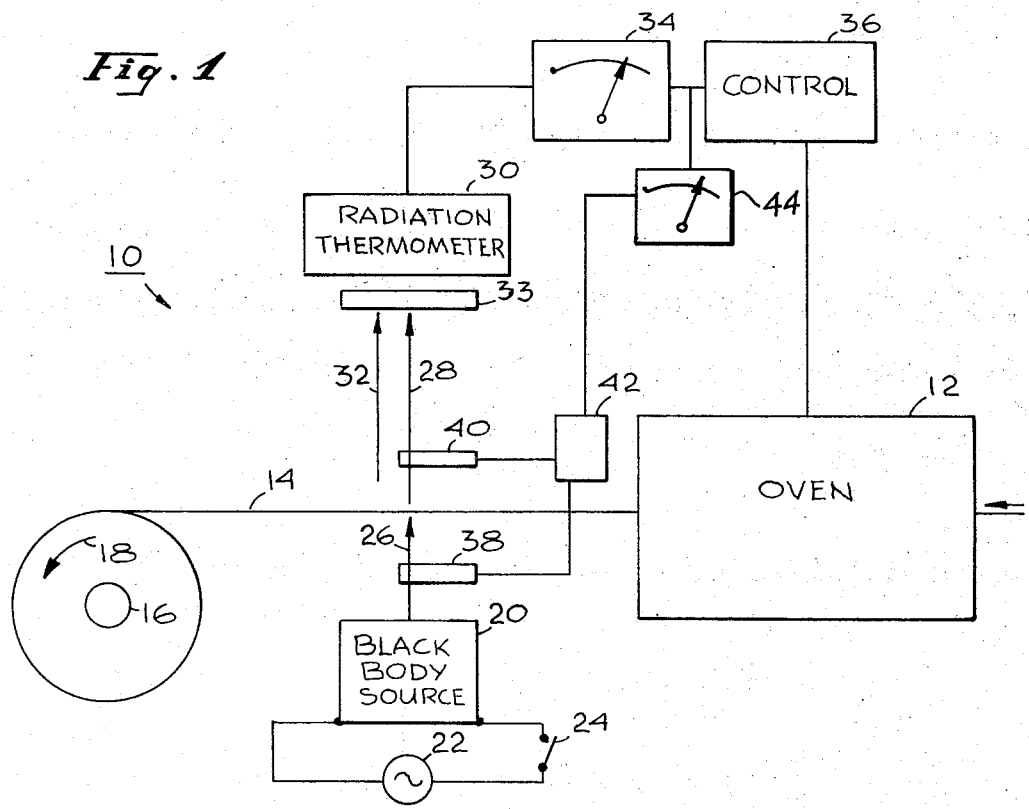

This invention relates to the temperature measurement art and more particularly to an improved arrangement for controlling the temperature of a transparent, semi-transparent, or opaque material wherein the accuracy of control does not depend upon the variations or changes in the transmission characteristics of the material.

In many applications it is very desirable to control accurately the temperature of a material that during at least one step of its manufacturing process or one portion of a utilization of the material, the temperature of the material should be controlled, desirably, at a preselected value. Where the material is physically moving, as opposed to being in a standing position, generally some form of indirect temperature measurement is desired, and, further, where the material is transparent and has either a fixed or a variable transmission for electromagnetic radiation, difficulty has heretofore been experienced in measuring the temperature of such a material.

To the best of applicant's knowledge, no prior temperature measuring and/or control system has satisfactorily provided all of the above desiderata in a system for controlling the temperature of transparent or semi-transparent materials.

It will be appreciated, of course, that while applicant's invention is directed specifically toward solving the problem associated with measuring and controlling the temperature of a moving transparent or semi-transparent material, it will be appreciated that in many applications, applicant's invention may also be utilized effectively in measuring the temperature and controlling the temperature of an opaque material and/or a static material.

Accordingly, it is an object of the applicant's invention herein to provide an improved temperature control arrangement.

It is another object of applicant's invention herein to provide a temperature control arrangement that accurately controls the temperature of transparent and semi-transparent moving materials.

The above and other objects are achieved, according to one embodiment of applicant's invention, by providing a black body radiation source that is set for a preselected temperature and is adapted to emit substantially black body electromagnetic radiations in a first direction. A temperature controlled material, that is the material whose temperature is to be controlled, passes in front of the black body source and the electromagnetic radiation emitted from the black body source passes at least partially through the material. In this example of applicant's invention, the material may be considered to be a plastic, such as polyethylene, and it emanates from an oven wherein it is to be maintained at a particular temperature and is wound upon a reel. Thus, the polyethylene is moving from the oven to the reel. The polyethylene itself emits electromagnetic radiation and the polyethylene has a certain predetermined and known emissivity and the reflectivity of the polyethylene is substantially zero.

A radiation thermometer is positioned in a spaced apart relationship from the polyethylene and the black body source and is adapted to receive the electromagnetic radiation emitted by the black body and by the polyethylene. The radiation thermometer is of the type that is adapted to generate an information signal that has a magnitude proportional to some known function of the magnitude of the electromagnetic radiation that is incident thereon.

A control means coupled to the radiation thermometer and to the oven is adapted to receive the information signal generated by the radiation thermometer and to generate an error signal in response to the magnitude of the information signal. The error signal has a magnitude that is proportional to the deviation of the information signal, either greater or less, than a fixed value. The fixed value is that value of information signal that corresponds to the condition of the temperature controlled material at the temperature at which it is desired to maintain the temperature controlled material and this is the preselected temperature at which the black body source is also maintained.

For the conditions of the temperature controlled material maintained at the preselected temperature, no error signal is fed into the oven and hence the oven maintains the polyethylene at the desired preselected temperature. On the other hand, according to applicant's invention herein, for deviation of the temperature of the polyethylene from the preselected temperature, the magnitude of the information signal and the magnitude of the error signal change from the predetermined value and provide a unique, that is a one valued functional relationship, between the actual temperature of the polyethylene and some apparent temperature that is measured by the radiation thermometer. The control signal then increases or decreases the temperature in the oven depending upon the deviation of this apparent temperature from the actual temperature.

Figure 2:
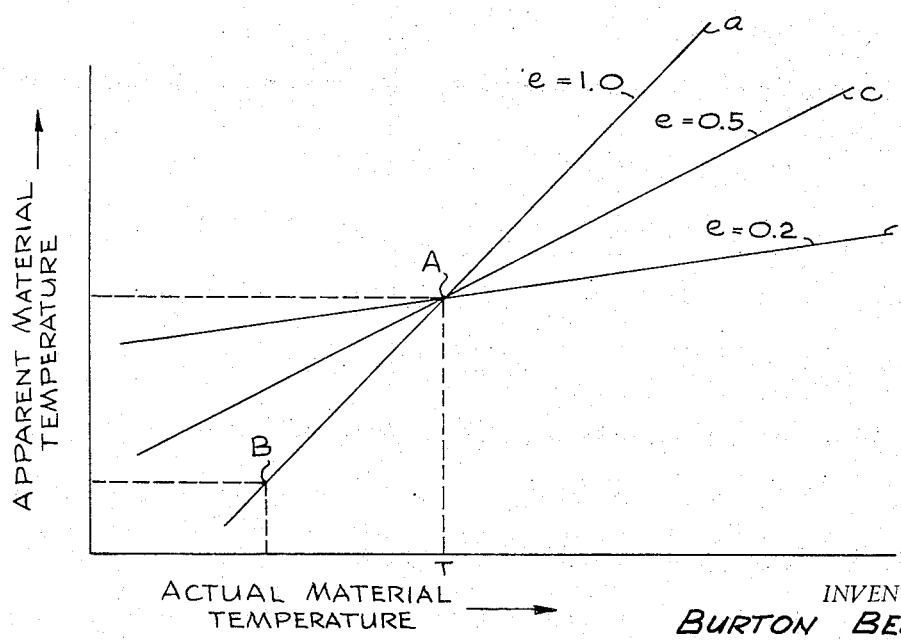

The above and other embodiments of applicant's invention are more fully explained in the following detailed description, taken together with the accompanying drawings wherein similar reference characters refer to similar elements throughout and in which:

FIGURE 1 is a semi-schematic representation of one embodiment of applicant's invention; and FIGURE 2 is a graphical representation of the relationship between apparent temperature and actual temperature of a temperature controlled medium in one embodiment of applicant's invention.

Referring now to FIGURE 1, there is shown, in semi-schematic form, the structure associated with one embodiment of applicant's invention herein. As shown on FIGURE 1, there is a temperature control arrangement generally designated 10 having an oven 12 that is adapted to heat a moving sheet of temperature controlled material 14 which, in this embodiment of applicant's invention, may be considered to be polyethylene. It will be appreciated, of course, that utilization of polyethylene as an example in the description of applicant's invention shown on FIGURE 1 is for illustrative purposes only, as is the specific designation of each of the structural elements comprising applicant's improved temperature control arrangement, and no limitation on applicant's invention is intended or is to be construed by the mentioning of specific materials and/or specific components.

The polyethylene sheet 14 is adapted to be wound upon a reel means 16 in the direction indicated by the arrow 18. The oven 12 is adapted to heat the polyethylene 14 and to maintain the polyethylene 14 at a preselected temperature. The polyethylene 14 has a transmissivity and an emissivity. In general, however, it has been founnd that materials such as polyethylene do not have an appreciable or even significant reflectivity during a heated condition and for substantially incident electromagnetic radiation, consequently, the polyethylene 14 may be considered to have a reflectivity of zero, and therefore the characteristics of the polyethylene that are significant in applicant's invention herein are the emissivity and the transmissivity. It will be appreciated, however, that if there is an appreciable or significant reflectivity, the equation defining the performance of the structural element of applicant's invention may be suitably adjusted in order that the proper and accurate temperature control may be maintained.

A black body source 20 which, for example, may be of the type that is heated by electrical energy from a source of electrical energy 22 controlled through a switch means 24 is adapted to be set at the preselected temperature at which the oven 12 is to maintain the sheet of polyethylene 14 and, consequently, the black body source 20 emits substantially black body electromagnetic radiation, indicated by the arrow 26 in a first direction. In this embodiment of applicant's invention, the first direction selected is substantially at right angles to the plane of the sheet of polyethylene 14. However, it will be appreciated, that the semi-schematic representation shown in FIGURE 1 may be varied in actual installations so that the electromagnetic radiations 26 may be incident on the polyethylene 14 in directions other than substantially right angles.

The polyethylene 14, as noted above, has a certain transmissivity that, according to the principles of applicant's invention herein, may vary and the exact value or the variation thereof from point to point on the sheet of polyethylene 14 as it is wound on the reel 16, that is, each portion that passes in front of the black body source 20 and has the electromagnetic radiation 26 impinging thereon, may vary in any known or unknown way and still not affect the accuracy of temperature control provided by applicant's improved temperature control arrangement.

It will be appreciated that virtually no physical object has a 100% transmission, that is a transmissivity of one, and, consequently, a certain amount of the electromagnetic radiation 26 is absorbed by the polyethylene 14. This amount of electromagnetic radiation is, in general, not sufficient to injure, in any way, the polyethylene 14. However, a certain reduced amount of electromagnetic radiation, indicated by the arrow 28, is actually transmitted all the way through the sheet of the polyethylene 14 and is incident on a radiation thermometer 30. Also, the polyethylene sheet 14, since it is maintained at a preselected temperature which corresponds to the temperature of the black body source 20, emits electromagnetic radiation as indicated by the arrow 32. The electromagnetic radiation 32 is also adapted to be incident upon the radiation thermometer 30.

The transmissivity and the emissivity of the polyethylene 14 are not independently variable characteristics but, instead, are closely related and this relationship may be expressed by the following equation:

(1) $$t_p = 1 - e_p$$

where:

$t_p$ = transmissivity of material 14
$e_p$ = emissivity of material 14

The radiation thermometer 30 is adapted to receive the electromagnetic radiation 28 and 32 and to generate an information signal having a magnitude proportional to the magnitude of at least one preselected wavelength bandwidth of electromagnetic radiation contained in the electromagnetic radiations 28 and 32 that is incident thereupon. Various types of radiation detectors may be utilized in the radiation thermometer, according to applicant's invention herein, and those skilled in the art will be acquainted with the method of varying the control arrangement provided by applicant's invention herein depending upon the precise type of electromagnetic radiation detector that is included in the radiation thermometer 30. That is, for example, the radiation thermometer 30 may comprise an electromagnetic radiation detector of the type that varies in on electrical characteristic depending upon the electromagnetic radiation magnitude incident thereupon. Such detectors may, of course, be lead sulfide, lead selenide, lead teluride, indium antimonide or the like. On the other hand, the radiation thermometer 30 may include as a radiation detector a bolometer, a thermopile, or other radiation sensitive devices. The only requirement for the radiation detector included in the radiation thermometer 30 is that the radiation thermometer 30 provide a signal dependent upon the intensity of electromagnetic radiation at least one preselected wavelength bandwidth that is incident thereon.

If desired, for certain types of detectors, it may be desirable to include a filter means 33 with the radiation thermometer 30 to narrow the bandwidth of electromagnetic radiation that is incident on the radiation thermometer. Thus, if the radiation thermometer has an indium antimonide detector the preferred spectral response is between the wavelength of 1.0 and 7.0 microns and thus the filter 33 may filter out other wavelengths of electromagnetic radiation, or, if desired, some preselected wavelength bandwidth within the 1.0 to 7.0 bandwidth. The information signal generated by the radiation thermometer may be fed to a meter 34 which would indicate the temperature of the polyethylene 14 as measured by the radiation thermometer 30. As noted below, the temperature shown on the meter may not be the actual temperature of the polyethylene 14 but may deviate from the actual temperature by a certain known amount.

The information signal is then fed to a control 36 that is adapted to receive the information signal and generate an error signal having a magnitude proportional to the deviations of the information signal from a predetermined value. This error signal may be considered to be either plus or minus depending upon whether the information signal is greater or less than the predetermined value. The error signal is then fed to the oven 12 to control the temperature of the oven 12, and thereby control the temperature of the polyethylene 14.

Since the emissivity of a black body is one and since the transmissivity and emissivity of the polyethylene 14 are related as indicated by Equation 1 above, and, for the condition where indium antimonide is the detector for which the radiation thermometer 30 provides an information signal proportional to the third power of the temperature of the object radiating energy that is received by the radiation thermometer 30, for the condition where the polyethylene 14 is at the preselected temperature which is the temperature at which the black body source 20 is maintained, the information signal will have a magnitude indicated by Equation 2.

(2) $$V_0 = KT^3$$

where:

$K$ = a constant that takes into account the optical and electronic gain of a radiation thermometer, the attenuation of energy through the lenses and, if present, the filter 33, the responsivity, and spectral response, of the indium antimonide detector, and the Stefan-Boltzmann constant; and $T$=temperature at which the polyethylene is maintained; and $V_0$=the magnitude of the information signal generated by the radiation thermometer.

From the above, it can be seen that the transmissivity of the polyethylene 14 has no affect on the magnitude of the information of the signal generated by the radiation thermometer 30 wherein the temperature of the polyethylene 14 is equal to the temperature of the black body source 20 and that is the desired temperature at which it is desired to maintain the polyethylene 14. Since transmission and the transmissivity is determined mostly by the thickness of the polyethylene 14, thickness will not affect the magnitude of the information signal or the error signal in any way as long as the polyethylene 14 and black body source 20 are maintained at the same temperature. It will be appreciated of course, that the black body source 20 may be maintained at a predetermined temperature within any substantially desired degree of accuracy over extended periods of time.

Moreover, if the black body source 20 is maintained at the desired temperature and, for some reason, the oven should change its heating characteristics such that the polyethylene 14 is no longer at the desired temperature, then the information signal will have a magnitude defined by the following equation:

(3) $$V_0 = KT_{APP}^3$$

where:

$T_{APP}$=the apparent temperature of the polyethylene 14.

The emissivity of the polyethylene is not necessary since the apparent temperature is independent of emissivity and is not a real tempertaure. However, the apparent temperature is related to the actual temperature as well as the temperature of the black body by the following equation:

(4) $$V_0 = KT_{APP}^3 = K(e_p(T_{ACT})^3 + t_p T^3)$$

where:

$T_{ACT}$=the actual temperature of the polyethylene 14.

It can be seen from Equation 4 above, that the emissivity and transmissivity of the polyethylene 14 are present as in this equation and consequently must be evaluated.

FIGURE 2 illustrates the variation of the apparent material temperature and the actual material temperature for various emissivities. As shown on FIGURE 2, the curve $a$ is where the emissivity is equal to one and for the emissivity equal to one the material 14 is opaque and consequently at all points, such as point A and point B, the apparent material temperature is equal to the actual material temperature. At the other extreme, that is where the emissivity is equal to zero, the radiation thermometer 30 is receiving only the electromagnetic radiation 26 and consequently the equation becomes indeterminate since the apparent material temperature is always equal to the black body temperature. However, for emissivities other than zero, such as 0.2 or 0.5, as indicated by curves $b$ and $c$, respectively, there is a unique one valued functional relationship between the apparent material temperature and the actual material temperature and, consequently, the information signal provided by the radiation thermometer 30 is not ambiguous and for any apparent material temperature for a given emissivity there is only one actual material temperature corresponding thereto. Therefore, the information signal and the error signal both are single valued in relationship to the actual material temperature for variations in the apparent material temperature and consequently the oven 12 may be uniquely controlled thereby. Therefore, a substantially accurate control may be maintained for the oven 12 by the arrangement shown on FIGURE 1, independently of variations in transmissivity or emissivity of the material 14.

From FIGURE 2, it can be seen that the apparent temperatures of the temperature controlled material 14 differ from the preselected temperature of the black body source and the temperature at which said temperature controlled material should be maintained, varies depending upon the transmissivity and/or emissivity of the temperature controlled material 14. Since the transmissivity and emissivity are related, as defined by Equation 1 above, measurement of knowledge of error can provide knowledge of the magnitude of the other.

Thus, it may be desirable, in some applications, to measure the actual temperature or the material 14 in addition to controlling the temperature of the temperature controlled material 14 at the preselected temperature value when the actual temperature of the temperature-controlled material 14 varies therefrom. Applicant has found it desirable to measure the transmissivity and to generate a ratio signal that may be supplied to a meter 44 to vary the magnitude of the information signal depending upon the transmissivity and consequently the emissivity of the temperature controlled material 14.

As shown on FIGURE 1, applicant may provide a signal varying means for accomplishing the above variation of the information signal generated by the radiation thermometer 30, and this signal varying means may generally comprise a first radiation detection means 38 that is positioned to receive electromagnetic radiation 26 emitted from the black body source 20 before the traverse of the temperature controlled temperature 14. The first radiation detection means 38 is adapted to generate to control signal having a magnitude proportional to the intensity of the electromagnetic radiation 26 emitted from the black body source 20.

A second radiation detection means 30, which may be similar to the first radiation detection means 38 is positioned to measure the intensity of the electromagnetic radiation 28 which is the electromagnetic radiation emitted by the black body 20 after it has traversed the temperature controlled material 14. The second radiation detection means 40 is adapted to generate a second control signal for a magnitude proportional to the intensity of the electromagnetic radiation 28.

Since the transmissivity of the temperature controlled material 14 is, by definition, the ratio of the intensity of the electromagnetic radiation 28 to the electromagnetic radiation 26, the first control signal and the second control signal are supplied to signal divider means 42 which generates a ratio signal having a magnitude proportional to the ratio of the second control signal to the first control signal. This ratio signal is then fed into the meter 40 to vary the magnitude of the information signal depending upon the value of the transmissivity of the temperature control material 14, to provide a measure of the absolute temperature. It will be appreciated, of course, that for the condition of the temperature controlled material 14 at the preselected temperature, the information signal by the radiation thermometer 30 indicates the actual temperature.

Applicant's first radiation detection means 38 and second radiation detection means 40 may, if desired, be any of the well-known electro-magnetic radiation detector devices commonly utilized. For example, they may be any of the types of electromagnetic radiation detectors specified for utilization above in the radiation thermometer 30. Further, the meter 44 may be similar to the meter 34 described above and the signal divider means may be in commonly available signal dividers such as, for example, that manufactured by Philbrick Researches, Inc., Dedham, Massachusetts, Model No. Q3–M1P.

This concludes the description of applicant's improved temperature control arrangement. From the above, it can be seen that applicant has provided a temperature control arrangement that may accurately control the temperature of moving materials that are transparent, semi-transparent or have at least one transmissivity value for at least a preselected wavelength bandwidth electromagnetic radiation.

In practice, applicant has found that the components described above may be selected from various manufacturers. For example, the controller 36 may be a temperature controller, such as the electronic proportional temperature controller manufactured by Electro Optical Industries, Inc., of Goleta, Calif., and of the Series 200. The radiation thermometer may, for example, be an Ircon, Inc., of Chicago, Ill., Series 700, Series 300 or the like. The black body source 20 may be of any manufacturer such as the black body manufactured by the above-mentioned Electro Optical Industries, Inc.

Those skilled in the art may find many variations and adaptations of applicant's improved temperature control arrangement. Accordingly, the following claims are intended to cover all such variations and adaptations falling within the true scope and spirit of applicant's invention.

I claim:

1. A temperature control arrangement comprising, in combination:
   a black body radiation source maintained at a preselected temperature for emitting substantially black body electromagnetic radiation in a first direction and said electromagnetic radiation having energy in at least one preselected wavelength bandwidth;
   a radiation thermometer aligned in said direction for receiving said substantially black body electromagnetic radiation and spaced apart from said black body source, and said radiation thermometer responsive to said at least one preselected wavelength bandwidth for generating an information signal having a magnitude proportional to a function of the magnitude of the incident electromagnetic radiation in said at least one preselected wavelength bandwidth;
   a temperature controlled material adapted to pass intermediate said black body radiation source to be maintained at said preselected temperature, and said temperature controlled medium emitting electromagnetic radiation having energy in said at least one preselected wavelength bandwidth and in said direction, and said radiation thermometer aligned to receive said electromagnetic radiation emitted from said temperature controlled material;
   heating means for heating said temperature controlled material;
   and control means coupled to said radiation thermometer and said heating means for receiving said information signal and generating an error signal in response thereto for controlling the temperature of said heating means to control the temperature of said temperature controlled material at said preselected temperature.

2. The arrangement defined in claim 1 wherein said radiation thermometer further comprises an electromagnetic radiation detector of the type changing an electrical characteristic in response to changes in the magnitude of the electromagnetic radiation in said at least one preselected wavelength bandwidth incident thereon.

3. The arrangement defined in claim 1 wherein said radiation thermometer further comprises a bolometer for receiving said electromagnetic radiation having energy in said at least one preselected wavelength bandwidth emitted from said black body source and said temperature controlled material.

4. The arrangement defined in claim 1 wherein said at least one preselected wavelength bandwidth is in the infrared portion of the electromagnetic radiation spectrum.

5. The arrangement defined in claim 4 wherein said radiation thermometer is indium antimonide and said radiation thermometer generates an information signal proportionate to the third power of the absolute temperature of said black body source and said temperature controlled material.

6. The arrangement defined in claim 2 wherein said electromagnetic radiation detector comprises a detector selected from the class consisting of lead sulfide, lead selenide, lead teluride and indium antimonide.

7. The arrangement defined in claim 1 wherein said temperature controlled material is polyethylene, said heating means is an oven, and said preselected temperature is on the order of 200° F.

8. The arrangement defined in claim 5 wherein said temperature controlled material is polyethylene, said heating means is an oven, and said preselected temperature is on the order of 200° F.

9. The arrangement defined in claim 1 and further including signal varying means for varying the magnitude of said error signal as a function of the magnitude of the transmissivity of said temperature controlled material.

10. The arrangement defined in claim 9 wherein said signal varying means comprises:
    first radiation detection means to detect the intensity of said electromagnetic radiation emitted from said black body source before said electromagnetic radiation traverses said temperature controlled material for generating a control signal having a magnitude proportional to said detected intensity of said electromagnetic radiation;
    a second radiation detection means to detect the intensity of said electromagnetic radiation emitted from said black body source after said electromagnetic radiation traverses said temperature controlled material for generating a second control signal for a magnitude proportional to said detected electromagnetic radiation;
    and means coupled to said first and said second radiation detection means and said temperature control means for receiving said first control signal and said second control signal and providing a ratio signal having a magnitude proportional to the ratio of said second control signal to said first control signal, and feeding said ratio control signal to said temperature control means to vary the magnitude of said error signal for the condition of the temperature of said temperature controlled material at a temperature different from said preselected temperature.

References Cited

UNITED STATES PATENTS

| | | | |
|---|---|---|---|
| 2,668,701 | 2/1954 | Dietrich | 263—3 |
| 2,690,078 | 9/1954 | Phillips | 236—15 |
| 2,846,882 | 8/1958 | Gray | 236—15 |

FREDERICK L. MATTESON, JR., *Primary Examiner.*

JOHN J. CAMBY, *Examiner.*